United States Patent
Rinn et al.

[11] Patent Number: 6,045,096
[45] Date of Patent: Apr. 4, 2000

[54] VARIABLE CAMBER AIRFOIL

[76] Inventors: Aaron Rinn, 2571 N. Lima Center Rd., Dexter, Mich. 48130; Somphone Khamly, 1159 Golfcrest Dr., Wyoming, Mich. 49509; David Hornick, 4123 Brooklyn Rd., Jackson, Mich. 49201; Matthew Obrigkeit, 2220 Edsel, Trenton, Mich. 48183; Sridhar Kota, 9391 Quail Ridge Run, Brighton, Mich. 48114

[21] Appl. No.: 09/109,295

[22] Filed: Jun. 30, 1998

[51] Int. Cl.$^7$ ........................................................ B64C 3/44
[52] U.S. Cl. ............................................................ 244/219
[58] Field of Search .................................. 244/213, 214, 244/215, 219, 90 R, 123

[56] References Cited

U.S. PATENT DOCUMENTS

| | | |
|---|---|---|
| 1,747,637 | 2/1930 | Larsen ........................................ 244/219 |
| 1,803,915 | 5/1931 | Parmele . |
| 1,886,362 | 11/1932 | Antoni . |
| 2,022,806 | 7/1935 | Grant . |
| 2,125,064 | 7/1938 | Burgess . |
| 2,223,335 | 11/1940 | Stewart . |
| 2,372,447 | 5/1945 | Peters . |
| 3,076,623 | 2/1963 | Lyon . |
| 3,127,130 | 3/1964 | Lyon . |
| 3,179,357 | 4/1965 | Lyon . |
| 3,332,383 | 7/1967 | Wright ........................................ 244/219 |
| 3,716,209 | 2/1973 | Pierce .......................................... 244/219 |
| 3,930,626 | 1/1976 | Croswell, Jr. . |
| 3,986,688 | 10/1976 | Giragosian . |
| 4,247,066 | 1/1981 | Frost et al. . |
| 4,296,900 | 10/1981 | Krall . |
| 4,341,176 | 7/1982 | Orrison . |
| 4,400,642 | 8/1983 | Kiraly . |
| 4,432,516 | 2/1984 | Muscatell . |
| 4,582,278 | 4/1986 | Ferguson . |
| 4,671,473 | 6/1987 | Goodson . |
| 5,288,039 | 2/1994 | DeLaurier . |
| 5,367,970 | 11/1994 | Beauchamp . |
| 5,433,404 | 7/1995 | Ashill . |
| 5,531,407 | 7/1996 | Austin . |
| 5,681,014 | 10/1997 | Palmer . |

FOREIGN PATENT DOCUMENTS

| | | | |
|---|---|---|---|
| 501364 | 7/1930 | Germany | ................................ 244/219 |

*Primary Examiner*—Galen L. Barefoot
*Attorney, Agent, or Firm*—Artz & Artz, P.C.

[57] ABSTRACT

A variable camber airfoil has a leading portion and a trailing portion that is pivotally coupled to the trailing portion. A flexible skin substantially encloses the leading portion and the trailing portion and generally defines an airfoil profile. The skin is fixedly coupled to the trailing portion and is slidably coupled to the leading portion. Upon movement of the tail portion, the skin changes position with respect to the leading portion, and the internal structure of the wing changes the profile of the wing. The internal support structure of the wing supports a pivot bar that extends from the leading portion to the trailing portion. The pivot bar is pivotally connected to the support structure. One end of the pivot bar is coupled to the trailing portion, and the other end of the pivot bar is coupled to a movement linkage. The operator controls are ultimately coupled to the pivot bar. A plurality of support arms are coupled between the skin and the support structure. The support arms position the skin with respect to the support structure. When increased lift is desired, the tail pivots downward and the skin slides about the nose so that the upper portion of the skin extends further from support structure and lower portion of the skin is brought closer to support structure. The opposite is true for a reduction in lift.

31 Claims, 3 Drawing Sheets

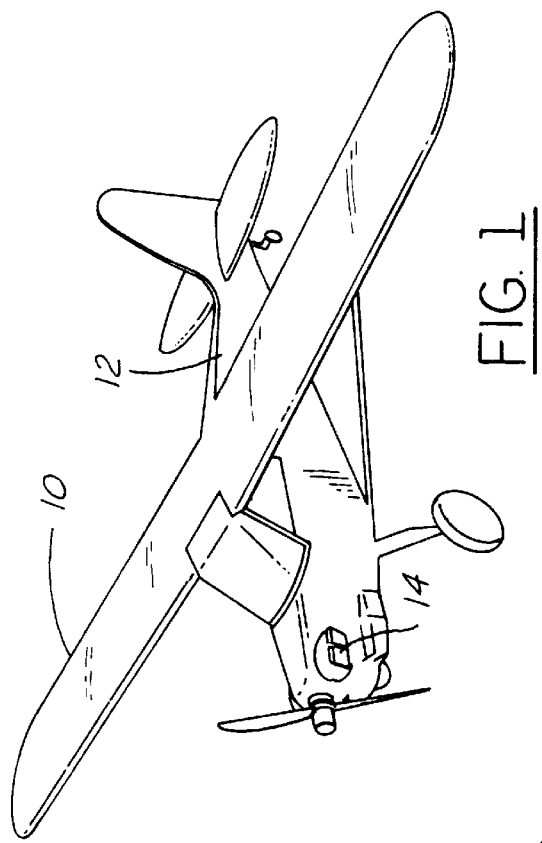
FIG. 1
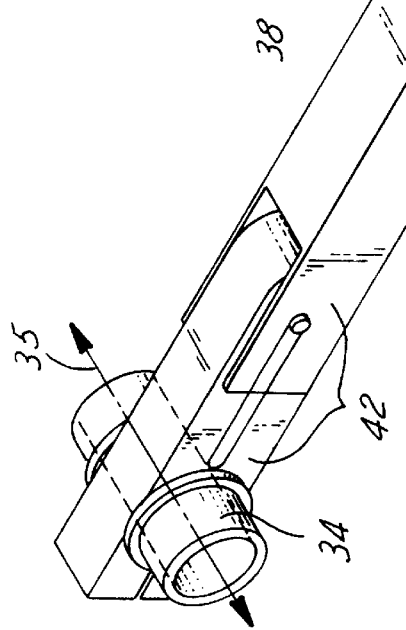
FIG. 5
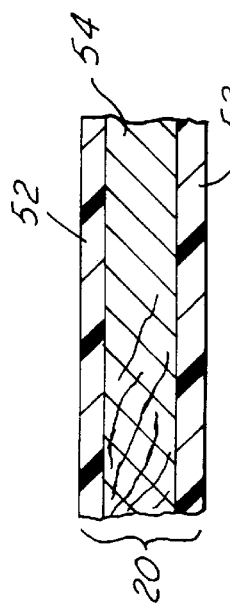
FIG. 7
FIG. 6

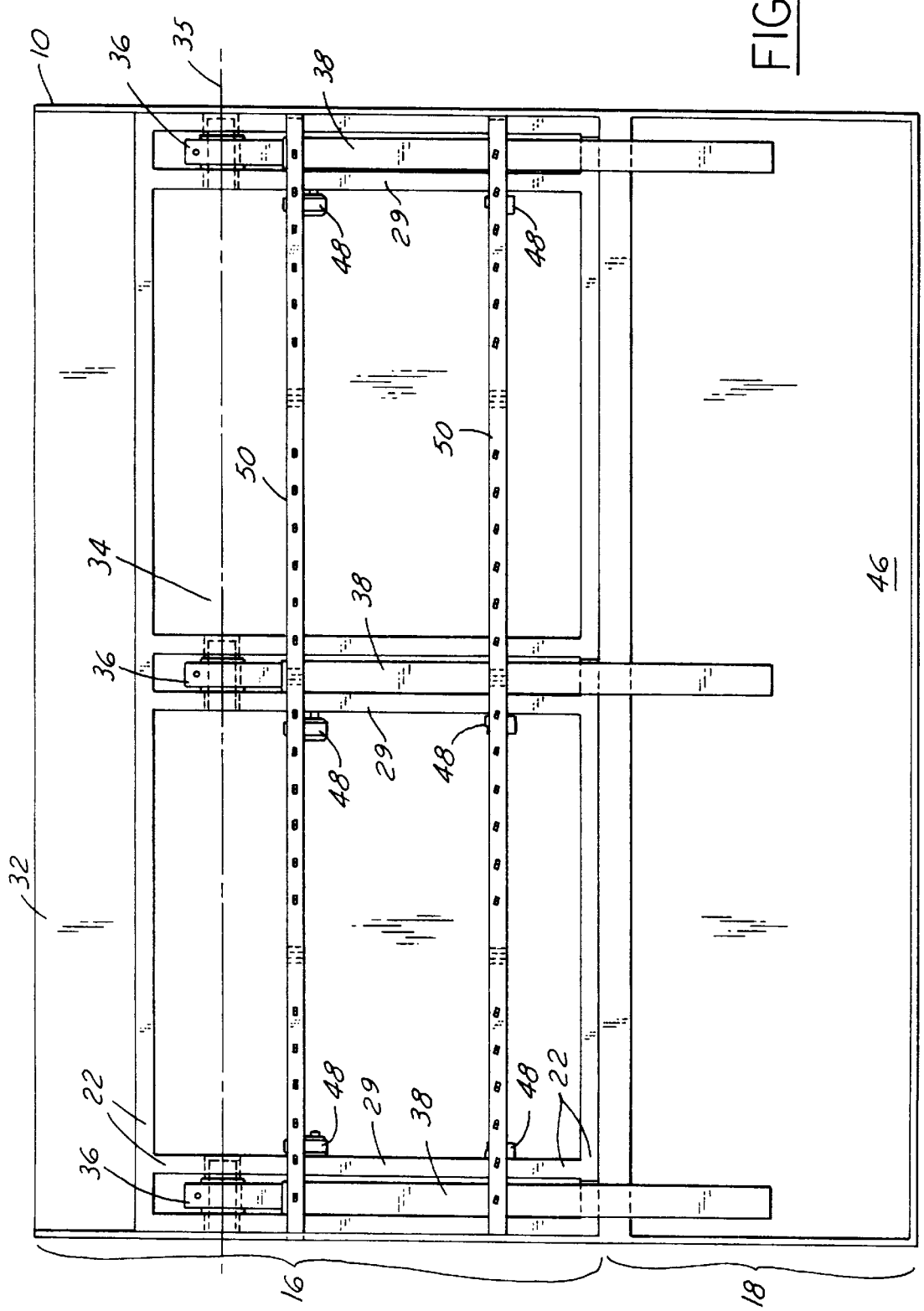

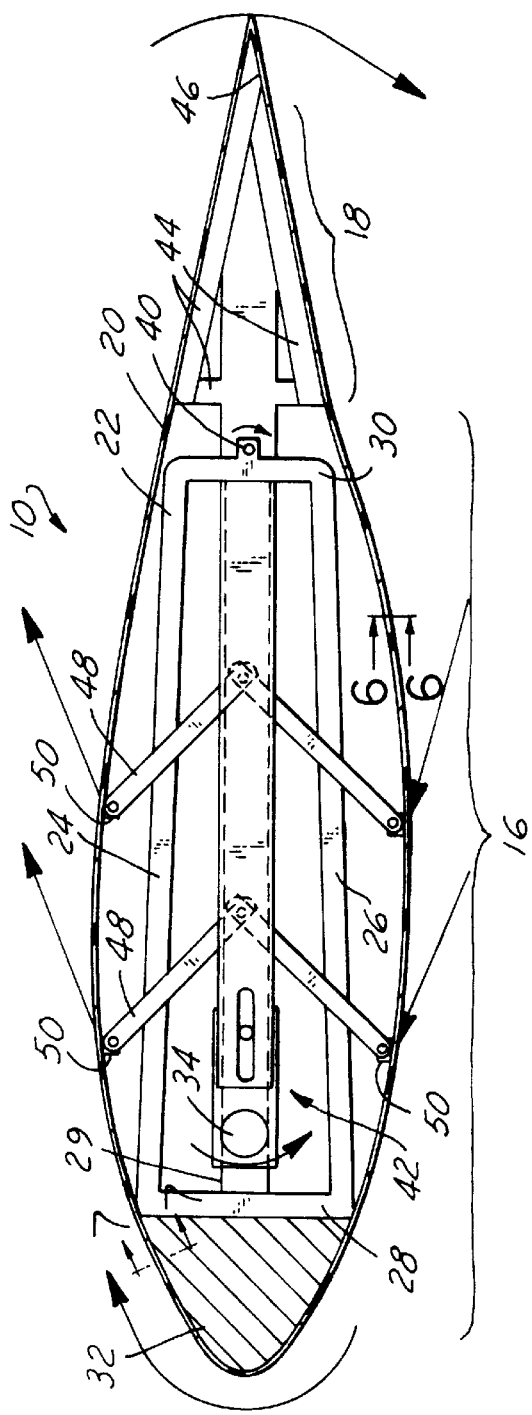

VARIABLE CAMBER AIRFOIL

BACKGROUND OF THE INVENTION

The present invention relates generally to airfoils, and more particularly to an airfoil having a variable cross section to provide the alterable lift characteristics.

Airplane wings provide an aircraft with lift and drag characteristics. During takeoff and landing, the wing must provide high lift at low speeds. To maintain a desired altitude, the wing must provide the same amount of lift at high speeds. The camber line of the wing is the mean line between the upper and lower wing surfaces. The chord line is a straight line between the leading and trailing edge of the wing. By increasing the camber line above the chord line, the lift of the wing is increased. By moving the camber line below the chord line, the lift becomes negative.

Conventionally, flaps are used to increase low lift speed. Flaps, when raised and lowered, generate a turbulence in the flow of air over the wing. Small gaps between the wing and flap add to the discontinuity. This is commonly known as a "dirty" configuration. The "dirty" configuration creates drag and makes the airfoil inefficient, increasing power requirements and using more fuel. Thus, maintaining a smooth flow over the wing surface would reduce turbulence and drag.

Several attempts have been made to reduce the drag associated with a wing by controlling the surface of the airfoil. One example is described in U.S. Pat. No. 4,247,066 in which a central jack screw is connected to several beam members. As the jack screw is rotated, the curvature of the wing is varied. One disadvantage to such a design is that the complex structure is believed to provide a significant weight penalty. Also, the wing is believed to be difficult to assemble.

Another U.S. Pat. No. 4,341,176 describes a reversible camber airfoil. This design is particularly suited for use in a sailboat application. The airfoil design comprises a plurality of rigid spars that connect the upper portion and lower portion of a flexible and movable skin. This design is not suitable for airplanes since there is no mechanism for changing the camber line of the airfoil. Changing the camber line allows an airplane wing to generate the desired high lift.

Another example of an adjustable airfoil is described in U.S. Pat. No. 4,582,278. This airfoil uses a thin secondary skin applied to the top primary skin of the aircraft surface. Pressurized fluid is introduced into the cavity between the primary skin and the secondary skin which causes the secondary skin to separate from the primary skin to cause a rounding effect on the upper surface of the airfoil. One problem associated with such a wing design is that the sealing the wing to provide the desired characteristics is believed to be unreliable.

U.S. Pat. No. 3,986,688 describes an airfoil having a variable configuration. The mechanism described controls the thickness of the leading edge of the wing. Hydraulic actuators coupled to a linkage mechanism are used to separate the upper surface and lower surface of the wing. One disadvantage to such an invention is that the trailing edge of the wing is not varied.

While various designs have been proposed in the art, manufacturability, weight and reliablility are disadvantages of many of the designs.

SUMMARY OF THE INVENTION

It is therefore one object of the invention to provide an airfoil structure that produces desirable lift characteristics while using lightweight, easy to manufacture and reliable linkage mechanisms.

In one aspect of the invention, an airfoil has a leading portion and a trailing portion pivotally coupled to the trailing portion. A skin substantially encloses the leading portion and the trailing portion to define an airfoil profile. The skin is fixedly coupled to the trailing portion and slidably coupled to the leading portion so that upon movement of the tail portion, the skin changes position with respect to the leading portion, and the airfoil profile is changed.

In a further aspect of the invention, a support structure is coupled within the leading portion. A pivot bar having a first end and a second end is pivotally coupled to the support structure. The pivot bar extends from the leading portion into the tail portion. An actuator rod and actuator linkage is coupled to the end of the pivot bar opposite the trailing portion. A plurality of skin support arms are coupled between the support structure and the skin. As the pivot bar is rotated by the actuator rod, the tail portion changes position. This, in turn, causes the skin to slide about the nose portion. The skin support arms change position and thus change the profile of the airfoil.

One advantage of the present invention is that the wing structure allows for the storage of fuel therein.

Another advantage of the invention is that due to its relatively simple structure, the wing is capable of more than 1,000 hours of flight time between complete inspections.

BRIEF DESCRIPTION OF THE DRAWINGS

Other features and advantages of the present invention will become apparent from the following detailed description which should be read in conjunction with the drawings in which:

FIG. 1 is a perspective view of an airplane having a variable camber wing assembly according to the present invention;

FIG. 2 is a top elevational view of an airplane wing with the outer skin removed to reveal the inner structure;

FIG. 3 is a cutaway view of the wing of FIG. 1 along line 3—3;

FIG. 4 is a cutaway view of the wing of FIG. 1 shown in a high lift configuration;

FIG. 5 is a perspective view of the linkage mechanism according to the present invention;

FIG. 6 is a cross sectional view of a portion of the skin along line 6—6 of FIG. 3; and FIG. 7 is a cross sectional view of a portion of the skin along line 7—7 of FIG. 3.

BEST MODE(S) FOR CARRYING OUT THE INVENTION

Referring now to the drawings, the same reference numerals are used to identify the same components in the various views. Although the invention will be described and illustrated in terms of an airplane wing, it will be appreciated that this invention may be used for various airfoil design such as tail fins for airplanes and rudder devices for boats.

Referring now to FIG. 1, an airfoil assembly 10 is coupled to an airplane body 12. Airplane body 12 is illustrated as mounted below airfoil assembly 10. However, the present invention is equally applicable to aircraft with various wing positions. Airplane body 12 is also illustrated as a propeller-based aircraft. Airplane body 12 may be one of a variety of types of aircrafts including aircraft having propellers mounted on the wing or a jet aircraft.

The camber of airfoil assembly 10 provides airplane body 12 with its desired lift. The camber of airfoil assembly 10 is controlled by the pilot of the aircraft through pedals 14 as illustrated or through other conventionally known means. The coupling between the operator controls and the wing may be hydraulic, electrical, mechanical, or any redundant combination of the above. The complexity of this system, of course, depends on the complexity of the aircraft to which the improved airfoil will be coupled.

Referring now to FIGS. 2, 3 and 5, airfoil assembly 10 has a leading portion 16 and a trailing portion 18. As will be further described below, leading portion 16 is pivotally coupled to trailing portion 18.

A skin 20 encloses leading portion 16 and trailing portion 18 and defines the profile of airfoil assembly 10. Skin 20 is preferably continuous to provide a smooth surface to reduce turbulence in the airflow over airfoil assembly 10. Skin 20 is preferably slidably coupled to leading portion 16 and fixedly coupled to trailing portion 18. Skin 20 is also flexible to allow trailing portion 18 to pivot with respect to trailing portion 18.

Leading portion 16 has a support structure 22 therein. Support structure 22 is preferably formed of a rigid lightweight material such as aluminum or a composite material. One suitable construction for support structure is a sandwich of polystyrene and fiber/epoxy composite.

As is shown best in FIG. 3, support structure 22 has a generally trapezoidal cross sectional profile. Other profiles such as rectangular or triangular would be evident to those skilled in the art. Support structure 22 has a top side 24, a bottom side 26, a front side 28, a cross member 29 and a back side 30. In forming the trapezoid, front side 28 is longer than back side 30.

As shown best in FIG. 2, support structure 22 preferably extends substantially across airfoil assembly 10. The exact shape of support structure 22 may be manipulated to be accommodated within various shaped airfoils.

Leading portion 16 has a nose 32 coupled to the front side 28 of support structure 22. Nose 32 is also preferably formed of a lightweight material. Preferably, nose 32 is formed of a hardened foam material such as expanded polystyrene. Nose 32 also extends substantially across the length of airfoil assembly 10. Skin 20 is in contact with nose 32 so that skin 20 can slide with respect to nose 32. A lubricant (not shown) such as a silicone may be applied to nose 32 to reduce friction between nose 32 and skin 20.

An actuator rod 34 extends within and is supported by support structure 22. Actuator rod 34 is coupled to the operator controls within airplane body 12. Actuator rod 34 is rotatably coupled to support structure 22. Actuator rod 34 rotates about longitudinal axis 35.

An actuator linkage 36 is fixedly coupled to actuator rod 34. As actuator rod 34 rotates, actuator linkage 36 also rotates about the axis of actuator rod 34.

A pivot bar 38 is coupled to support structure 22 at a pivot point 40. Pivot bar 38 extends into leading portion 16 and trailing portion 18. Pivot point 40 acts as a fulcrum around which pivot bar 38 rotates. As is best shown in FIG. 2, several pivot bars 38 may be employed within airfoil assembly 10.

The movement of pivot bar 38 is initiated by actuator linkage 36. A slidable coupling 42 joins pivot bar 38 and actuator linkage 36. As actuator linkage 36 moves in a counterclockwise direction, slidable coupling 42 is moved upward rotating pivot bar 38 in a clockwise direction about pivot point 40.

Pivot bar 38 extends into trailing portion 18. A frame 44 is enclosed within trailing portion 18 and is coupled to pivot bar 38. Frame 44 is also preferably formed from a lightweight material such as aluminum or a composite material. Frame 44 defines the preferred tapered cross section of trailing portion 18. Generally, frame 44 has a triangular cross section. One portion of triangular frame 44 defines the trailing edge 46 of airfoil assembly 10.

A plurality of support arms 48 are pivotally coupled between support structure 22 and skin 20. Preferably, support arms 48 are coupled to cross member 29. Of course, other locations for coupling support arms 48 to support structure 22 such as to top side 24 or bottom side 26 would be evident to those in the art. Support arms 48 are also made of a lightweight material such as aluminum or a composite material. Support arms 48 are rotatably coupled to a skin through a skin mount 50. As shown in FIG. 2, skin mount 50 may extend across the length of airfoil assembly 10. Support arms 48 support the flexible skin and define the outer profile of airfoil assembly 10.

Referring now to FIGS. 3 and 4, FIG. 3 is a cross sectional view of the airfoil in a lift-neutral position. The arrows on FIG. 3 illustrate the movement of the various parts to achieve a higher lift profile as shown in FIG. 4. That is, the camber line of airfoil 10 is raised. As pivot bar 34 rotates in a counterclockwise direction, pivot bar 38 rotates in a clockwise direction. This, in turn, causes trailing portion 18 and thus trailing edge 46 to be lowered. Because skin 20 is fixedly coupled to trailing portion 18, skin 20 slides around nose portion 32 in a clockwise direction. A silicone lubricant may be placed between skin 20 and nose portion 32 to reduce friction. Also, the top surface of skin 20 is further separated from support structure 22 in a position defined by the arc through which support arms 48 rotate. The lower portion of skin 20 is brought closer to support structure 22, also defined by the arc through which support arms 48 rotate. Also, the space between skin 20 and support structure 22 is moved rearward toward trailing portion 18. This profile also improves lift characteristics of airfoil assembly 10.

To decrease the lift of airfoil assembly 10, the opposite movement from that described above is performed. That is, actuator rod 34 is rotated in a counterclockwise direction causing pivot bar 38 to rotate in a counterclockwise direction. The skin 20 preferably then rotates in a counterclockwise direction about nose portion 32. The lower portion of skin 20 is moved outward while the upper portion of skin is moved inward.

Referring now to FIGS. 6 and 7, skin 20 preferably has a variable cross section. That is, because the portion of skin adjacent to nose portion 32 flexes considerably, a very flexible skin is desired in the nose region. A more rigid but still flexible skin is desired beyond or rearward of nose 32.

FIG. 6 illustrates a more rigid construction for skin 20 used in the rearward portion of airfoil assembly 10. Outer layers 52 of skin are preferably formed of a Kevlar, fiberglass, or carbon fiber-type material. Each of outer layers 52 may be built up from many thin layers of material. By crossing the grain of the fibers of the materials, airfoil assembly 10 may be strengthened. Outer layers 52 should be preferably formed of a lightweight and durable material. The particular composite material may be varied depending on the application. An inner layer 54 is preferably formed of a thin plywood material. Other materials may be suitable for inner layer. Such materials should resist buckling, have low weight and should be cost efficient. The combination of outer layers 52 and center layer 54 allow the main portion of the wing skin to flex while providing sufficient rigidity and durability.

Referring now to FIG. 7, skin 20 is preferably formed of a layer 56 or multiple layers of the same material. Preferably, layer 56 is a fiberglass material. However, other suitable material such as various epoxy-based composites and other composite materials may be used. Depending on the strength requirements, multiple fiberglass layers with grains in various directions may be combined to form layer 56. Preferably, layer 56 is an extension of the outermost outer layer 52 of FIG. 6.

Many of the connections between components are of the rotating type. For example, support arms 48 and skin mounts 50, as well as pivot bar 38 and pivot point 40 are rotatably coupled. Bushings may be used between such connections to reduce friction and improve wear between such connections. The components may be nylon or other polymeric materials such as Delrin.

While the best mode for carrying out the present invention has been described in detail, those familiar with the art to which this invention relates will recognize various alternative designs and embodiments for practicing the invention as defined by the following claims:

What is claimed is:

1. An airfoil assembly comprising:
    a leading portion;
    a trailing portion pivotally coupled to said leading portion;
    a skin substantially enclosing said leading portion and said trailing portion and defining an airfoil profile, said skin fixedly coupled to said trailing portion and slidably coupled to said leading portion;
    so that upon movement of said trailing portion said skin move around said leading portion and said airfoil profile is changed.

2. An airfoil as recited in claim 1 wherein further comprising a support structure coupled within said leading portion.

3. An airfoil as recited in claim 2 wherein an actuator rod rotatably coupled to said support structure and slidably coupled to a pivot bar, said pivot bar coupled to said support structure and to said trailing portion, so that upon rotation of said pivot bar, said trailing portion moves with respect to said leading portion.

4. An airfoil as recited in claim 1 wherein further comprising a plurality of skin support arms coupled between said support structure and said skin, said support structure at least partially defining said airfoil profile.

5. An airfoil assembly comprising:
    a leading portion;
    a trailing portion;
    a support structure coupled within said leading portion, said support structure having a pivot point;
    an actuator rod rotatably coupled to said leading portion;
    an actuator linkage fixedly coupled to said actuator rod;
    a pivot bar having a first end and a second end, said pivot bar pivotally coupled to said support structure at said pivot point;
    a skin substantially enclosing said leading portion and said trailing portion, said skin fixedly coupled to said trailing portion and slidably coupled to said leading portion; and
    a plurality of skin support arms coupled between said skin and said support structure,
    so that upon movement of said pivot bar, said tail portion moves causing said skin movement to be guided by said skin support arms.

6. An airfoil assembly as recited in claim 5 wherein said support structure is comprised of four sides.

7. An airfoil assembly as recited in claim 5 wherein said support structure is comprised of a generally trapezoidal-shaped cross section.

8. An airfoil assembly as recited in claim 7 wherein said support structure has a generally trapezoidal support structure has a leading side, a trailing side, a top side and a bottom side.

9. An airfoil assembly as recited in claim 8 wherein said back side has said pivot point.

10. An airfoil assembly as recited in claim 8 wherein said skin support arm are coupled to said a top side and to said bottom side.

11. An airfoil assembly as recited in claim 8 wherein said leading side is longer than said trailing side.

12. An airfoil assembly as recited in claim 5 wherein further comprising a nose portion coupled to said support structure.

13. An airfoil assembly as recited in claim 6 wherein said nose portion is comprised of a foam material.

14. An airfoil assembly as recited in claim 5 wherein said skin is flexible.

15. An airfoil assembly as recited in claim 5 wherein said skin is formed of a layer of plywood between two layers of a composite material.

16. An airfoil assembly as recited in claim 15 wherein said composite material comprises fiberglass.

17. An airfoil assembly as recited in claim 1 wherein said skin is has a leading portion, said leading portion comprises a single layer of composite material, said trailing portion comprises a layer of plywood between two layers of a composite material.

18. An airfoil assembly as recited in claim 5 wherein said trailing portion is comprised of a triangular shaped frame.

19. An airfoil assembly as recited in claim 5 further comprising a slidable coupling between said pivot bar and said linkage.

20. An airfoil assembly as recited in claim 5 further comprising skin mounts coupling said skin to said skin support arms.

21. An aircraft comprising:
    a body;
    an airfoil coupled to said body, said airfoil having, a leading portion and a trailing portion;
    a flexible skin generally enclosing said leading portion and said trailing portion and defining a profile of said airfoil, said skin fixedly coupled to said trailing portion and slidably coupled to said leading portion;
    a support structure coupled within said leading portion, said support structure having a top side and a bottom side and a pivot point;
    a pivot bar having a first end and a second end, said pivot bar pivotally coupled to said pivot point of said support structure;
    a plurality of skin support arms coupled between said top side and said bottom said of said support structure and said skin, said support arms at least partially defining said profile of said airfoil,
    a nose portion coupled to said support structure and slidably coupled to said skin;
    an actuator rod rotatably coupled to said support structure; and
    an actuator linkage fixedly coupled to said actuator rod;
    so that upon movement of said pivot bar, said tail portion moves causing said skin to move about said nose portion and to be guided by said support structure.

22. An aircraft assembly as recited in claim 21 wherein said support structure is comprised of four sides.

23. An aircraft assembly as recited in claim 21 wherein said support structure is comprised of a generally trapezoidal-shaped cross section.

24. An aircraft assembly as recited in claim 23 wherein said support structure has a generally trapezoidal support structure has a leading side, a trailing side, a top side and a bottom side.

25. An aircraft assembly as recited in claim 24 wherein said back side has said pivot point.

26. An aircraft assembly as recited in claim 24 wherein said skin support arm are coupled to said a top side and to said bottom side.

27. An aircraft assembly as recited in claim 24 wherein said leading side is longer than said trailing side.

28. An aircraft assembly as recited in claim 21 wherein further comprising a nose portion coupled to said support structure.

29. An aircraft assembly as recited in claim 21 wherein said trailing portion is comprised of a triangular shaped frame.

30. An aircraft assembly as recited in claim 21 further comprising a slidable coupling between said pivot bar and said linkage.

31. An aircraft assembly as recited in claim 21 further comprising skin mounts coupling said skin to said skin support arms.

* * * * *